United States Patent
Ottersbach et al.

(10) Patent No.: US 8,950,369 B2
(45) Date of Patent: *Feb. 10, 2015

(54) DEVICE FOR VARYING THE ANGULAR POSITION OF A CAMSHAFT RELATIVE TO A CRANKSHAFT OF AN INTERNAL COMBUSTION ENGINE

(75) Inventors: Rainer Ottersbach, Aurachtal (DE);
Juergen Weber, Erlangen (DE);
Christoph Betz,
Untermembach/Hessdorf (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 466 days.

This patent is subject to a terminal disclaimer.

(21) Appl. No.: 12/884,388

(22) Filed: Sep. 17, 2010

(65) Prior Publication Data
US 2011/0067655 A1   Mar. 24, 2011

(30) Foreign Application Priority Data
Sep. 18, 2009   (DE) .......................... 10 2009 042 228

(51) Int. Cl.
*F01L 1/34* (2006.01)
*F01L 1/047* (2006.01)

(52) U.S. Cl.
CPC ..................................... *F01L 1/047* (2013.01)
USPC .................................................... 123/90.17

(58) Field of Classification Search
USPC ................ 123/90.15, 90.17, 90.31; 12/90.15,
12/90.17
See application file for complete search history.

(56) References Cited

U.S. PATENT DOCUMENTS

| | | | |
|---|---|---|---|
| 5,234,088 A | 8/1993 | Hampton | |
| 5,738,056 A | 4/1998 | Mikame et al. | |
| 6,026,772 A | 2/2000 | Shirabe | |
| 6,684,834 B2 | 2/2004 | Kohrs | |
| 6,772,721 B1 | 8/2004 | Gardner et al. | |
| 7,252,059 B2 | 8/2007 | Abbott et al. | |
| 7,263,957 B2* | 9/2007 | Miyakoshi et al. | 123/90.17 |
| 7,401,582 B2 | 7/2008 | Pierik et al. | |
| 7,597,076 B2 | 10/2009 | Strauss et al. | |
| 8,479,695 B2* | 7/2013 | Ottersbach et al. | 123/90.17 |
| 2001/0014215 A1* | 8/2001 | Ide et al. | 396/96 |
| 2002/0000213 A1 | 1/2002 | Fukuhara et al. | |
| 2002/0014215 A1* | 2/2002 | Ishii et al. | 123/90.17 |
| 2005/0098132 A1* | 5/2005 | Kusano et al. | 123/90.17 |

(Continued)

FOREIGN PATENT DOCUMENTS

| | | |
|---|---|---|
| CN | 1175661 A | 3/1998 |
| CN | 1696475 A | 11/2005 |

(Continued)

*Primary Examiner* — Thomas Denion
*Assistant Examiner* — Steven D Shipe
(74) *Attorney, Agent, or Firm* — Davidson, Davidson & Kappel, LLC

(57) ABSTRACT

A device for varying the angular position of a camshaft relative to a crankshaft of an internal combustion engine. The device has a drive element, which is driven by the crankshaft via a gearwheel and which is supported so that it can rotate in relation to the camshaft. The device also has at least two hydraulic chambers, to which a hydraulic fluid can be admitted in order to set a defined relative rotational position between the drive element and the camshaft, formed between the drive element and the camshaft. In order to produce an optimum axial support of the camshaft in terms of weight and cost, the gearwheel form a bearing face for the axial contact of the camshaft or of a component rotationally fixed to the latter.

14 Claims, 5 Drawing Sheets

(56) References Cited

U.S. PATENT DOCUMENTS

| | | |
|---|---|---|
| 2007/0101962 A1* | 5/2007 | Tsukada et al. ............ 123/90.17 |
| 2007/0199531 A1* | 8/2007 | Sugiura et al. ............ 123/90.17 |
| 2008/0271690 A1* | 11/2008 | Bayrakdar ................ 123/90.17 |
| 2009/0120392 A1 | 5/2009 | Takahashi et al. |
| 2009/0199797 A1* | 8/2009 | Schafer et al. ............ 123/90.17 |
| 2009/0211549 A1 | 8/2009 | Myers et al. |
| 2009/0250028 A1 | 10/2009 | Fujiyoshi et al. |
| 2010/0064998 A1* | 3/2010 | Hale et al. ................ 123/90.17 |
| 2010/0116233 A1 | 5/2010 | Weisser et al. |
| 2010/0242881 A1* | 9/2010 | Weber et al. ............. 123/90.17 |
| 2012/0204822 A1* | 8/2012 | Weber ........................ 123/56.2 |

FOREIGN PATENT DOCUMENTS

| | | |
|---|---|---|
| DE | 100 54 798 | 5/2002 |
| DE | 10 2004 007 050 | 9/2005 |
| DE | 10 2004 038 695 | 2/2006 |
| DE | 10 2004 062 038 | 7/2006 |
| DE | 102006036052 A1 | 2/2008 |
| DE | 102007035671 A1 | 1/2009 |
| WO | 0129377 | 4/2001 |
| WO | 03085238 A1 | 10/2003 |

* cited by examiner

DEVICE FOR VARYING THE ANGULAR POSITION OF A CAMSHAFT RELATIVE TO A CRANKSHAFT OF AN INTERNAL COMBUSTION ENGINE

This application claims the priority of DE 10 2009 042 228.5 filed Sep. 18, 2009, which is incorporated by reference herein.

DESCRIPTION

Field of the Invention

The invention relates to a device for varying the angular position of a camshaft relative to a crankshaft of an internal combustion engine, the device comprising a drive element, which is driven by the crankshaft via a gearwheel and which is supported so that it can rotate in relation to the camshaft, at least two hydraulic chambers, to which a hydraulic fluid can be admitted in order to set a defined relative rotational position between the drive element and the camshaft, being formed between the drive element and the camshaft.

BACKGROUND OF THE INVENTION

Camshaft adjusting devices, particularly those working hydraulically, are sufficiently well-known in the prior art. In the hydraulic camshaft adjuster there is a vane impeller, in which vanes are formed or arranged. The vanes are situated in hydraulic chambers, which are sunk in an external rotor. The internal rotor (connected to the camshaft) can be adjusted relative to the external rotor between an 'advanced stop' and a 'retarded stop' by way of corresponding admission of hydraulic fluid to the respective side of the hydraulic chambers. The flow of hydraulic oil is here controlled by an electrically actuated directional valve.

The rotary motion of the crankshaft is in this case transmitted to the external rotor via a gearwheel, which is rotationally fixed to the external rotor. In the prior art there are known solutions in which the gearwheel is embodied as a chain sprocket and is arranged at the outer circumference of the external rotor or rotationally fixed to the external rotor. Examples of this are disclosed in DE 100 54 798 A1, in DE 10 2004 007 050 A1, in DE 10 2004 038 695 A1 and in DE 10 2004 062 038 A1.

The camshaft is generally axially supported in the cylinder head, so that one camshaft end is first connected to the internal rotor of the camshaft adjuster by means of a central bolt or a weld. The axial support of the internal rotor in the camshaft adjuster thereby then also affords an axial support of the camshaft. The drive torque is transmitted to the external rotor by said gearwheel.

This type of axial support requires a stepped limit stop of a different diameter on the external surface of the camshaft. Producing this axial limit stop on the camshaft is disadvantageously associated with additional manufacturing and assembly outlay and thereby with corresponding costs.

This concept may furthermore forfeit the cost and weight advantages that accrue from using a continuous tube as the body of the camshaft. The camshaft must then additionally undergo radial deformation or metal cutting operations for the shaping of an axial limit stop.

A non-positive or cohesive material attachment of a limit stop element in the form of a sleeve is also associated with weight and cost disadvantages.

The gearwheel—in the form of a spur gear—is furthermore very disadvantageous for grinding processes, owing to its undercut between the end face of the toothed rim and the outer end face of the sealing cover of the adjuster. If the tooth flanks are to be ground in order to obtain an adequate toothing quality, the run-out of the grinding tool required by the production engineering process is no longer possible.

OBJECT OF THE INVENTION

The object of the present invention is to develop a device of the aforementioned type so that it is possible to provide an axial support of the camshaft in or on the camshaft adjuster, affording an optimum concept in terms of weight and cost. This is to take place on the camshaft adjuster when already connected to the camshaft end. At the same time it should also be readily possible to manufacture the requisite parts and in particular the toothing of the gearwheel to a high quality.

SUMMARY OF THE INVENTION

The solution to this object achieved by the invention is characterized in that the gearwheel forms a bearing face for the axial contact of the camshaft or of a component rotationally fixed to the latter.

The bearing face is here preferably embodied as a slide bearing face. It may be embodied, in particular, as a plane annular face.

The gearwheel is preferably embodied as an externally toothed spur gear.

The drive element may have at least one cover arranged on the end face, the gearwheel axially adjoining the cover and being connected to the latter positively and/or by cohesive material attachment. It is especially preferred if a multiple-splined connection or multiple-toothed connection is formed between the cover and the gearwheel. The multiple-splined connection may here have a number of splines or teeth extending radially outwards, which are arranged on the gearwheel and which extend into corresponding recesses in the cover. The multiple-splined connection may here have an axial fixing between the gearwheel and the cover in the form of at least one plastic deformation, which is introduced into the splines or teeth and/or into the recesses.

Alternatively it is also possible for the gearwheel and the cover to be positively connected to one another by means of a snap ring.

It is furthermore possible for the gearwheel and the cover to be positively connected to one another by means of a flanged section of the gearwheel.

The cover may be connected to the drive element by means of a screwed connection.

The gearwheel preferably has a hollow cylindrical body. Hollow cylindrical sections of reduced diameter may adjoin this body axially on both sides. The hollow cylindrical section facing the cover may furthermore have an annular groove-shaped undercut in its end face.

The outside diameter of the gearwheel is preferably smaller than the outside diameter of the drive element.

The invention is therefore geared to the concept of creating an axial limit stop for the camshaft-camshaft adjuster system between an end face of a sealing cover and the cylinder head of the internal combustion engine. Here the gearwheel, preferably embodied as a spur gear, and the sealing cover are of two-part design. For transmitting the drive torque, the connection between the sealing cover and the gearwheel is preferably embodied as a multiple-toothed profile with positive interlock. The tooth play of this connection in the multiple-toothed positive interlock may be removed through an axial plastic deformation of the positive interlock profile on the gearwheel in the already joined interlocking union.

The camshaft adjuster affixed to the camshaft end positively, non-positively or by cohesive material attachment here constitutes an axial support of the camshaft on the cylinder head. The end face of the spur gear remote from the camshaft adjuster serves as axial limit stop.

The spur gear may be manufactured as a single part of high production quality by forming, abrasion, sheet-metal lamination, forging, casting, sintering, compacting, hardening, grinding or in some similar way.

The sealing cover constitutes an annular component with screw holes or helical grooves for producing a screwed connection to the stator of the camshaft adjuster. The cover may be produced by forming, punching, abrasion, forging, casting, sintering, grinding, turning or in some similar way.

The gearwheel embodied as a spur gear may be provided on its one end face with a toothed hub, this toothing meshing radially in a corresponding profile on the inside diameter of the sealing cover and thus producing a positive interlock between the gearwheel (spur gear) and the sealing cover for transmitting the drive torque from the spur gear to the stator of the camshaft adjuster.

After axially joining the two toothed components, the gearwheel and the sealing cover, production tolerances, which lead to a play in the toothing, may be eliminated by undertaking a plastic deformation on the interacting toothing and/or recess. This can be done by means of a special tool. This ensures a positive interlock free from backlash between the spur gear and the sealing cover.

It is also possible that the tooth play is eliminated through a radial widening on the inside diameter of the toothed hub, which can be done with an expansion tool. It is also possible here to use a pressed-in expansion sleeve.

Said positive interlock can also be formed at the end face between the hub section of the gearwheel and the sealing cover. In this case the spur gear is inserted axially into the sealing cover, until the end-face toothing on the hub meshes free of backlash axially in the end-face mating toothing in the sealing cover. The spur gear is in this case guided by an additional centering of the hub in relation to the inside diameter of the sealing cover and is fixed in this centering by a transverse press-fit in an axial direction. Adhesive bonding may here also afford an additional safeguard against microscopic movement.

Through the introduction of the camshaft axial support on the spur gear and on the sealing cover of the camshaft adjuster, and preferably through the two-part design of the spur gear and the sealing cover, and through the positively interlocking connection between the spur gear and the sealing cover, it is possible to reduce the weight and the costs of the camshaft-camshaft adjuster system and to meet the high quality requirements demanded of the gearwheel toothing.

BRIEF DESCRIPTION OF THE FIGURES

Exemplary embodiments of the invention are represented in the drawings, in which.

DETAILED DESCRIPTION OF THE FIGURES

Figure 1:
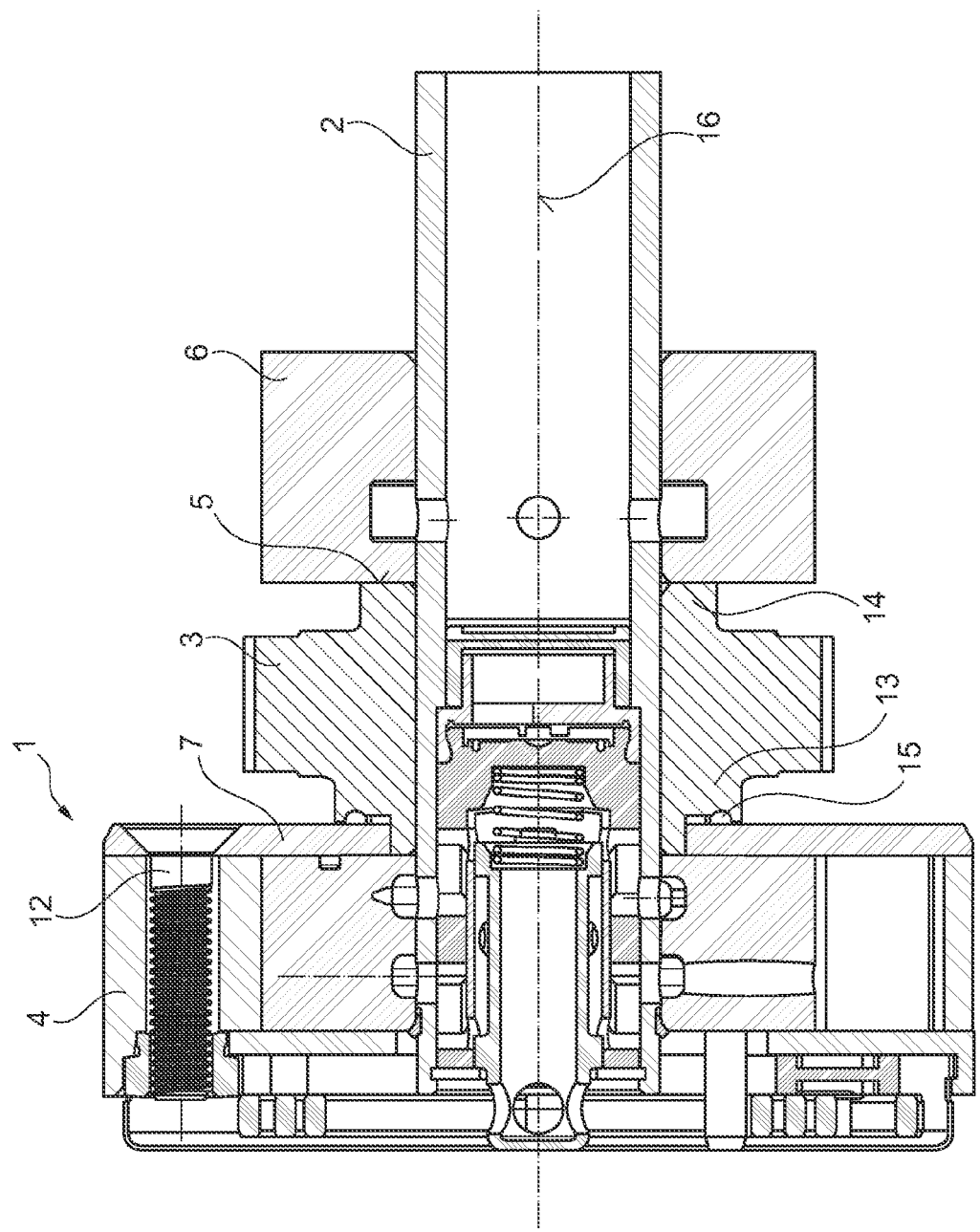
FIG. 1 shows the radial section through a device for varying the angular position of a camshaft relative to a crankshaft of an internal combustion engine, that is to say a camshaft adjuster.
Figures 2, 3:
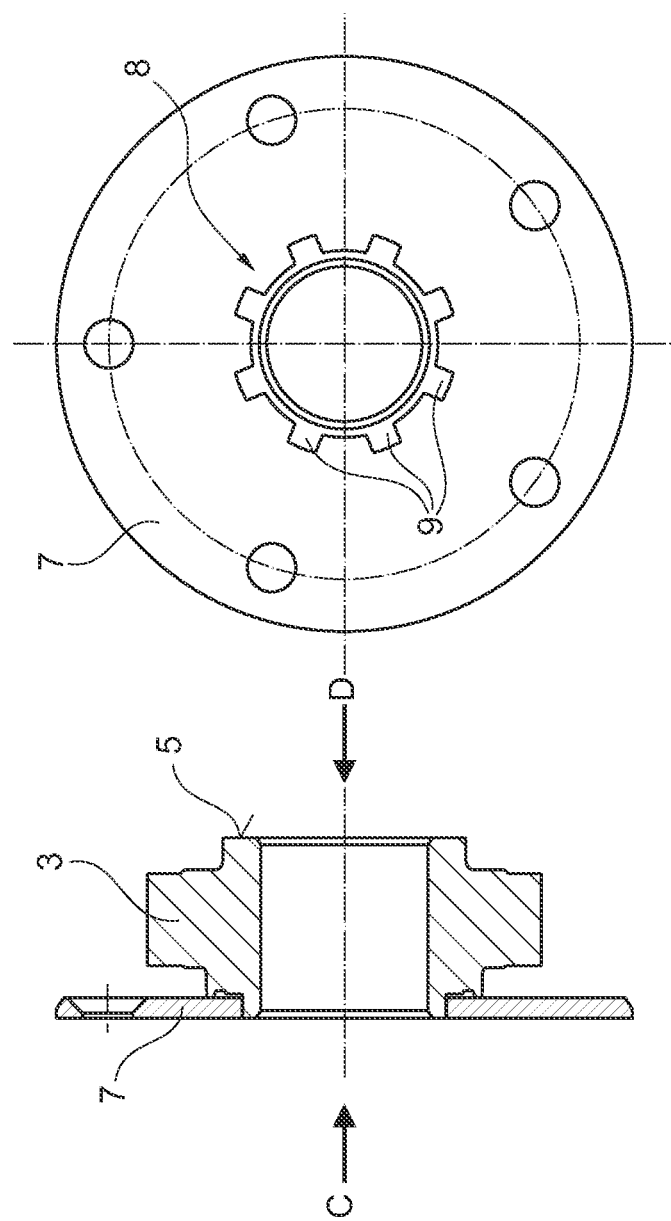
FIG. 2 shows the radial section through a cover of the camshaft adjuster, which is connected to a gearwheel of the camshaft adjuster.
FIG. 3 shows the cover of the camshaft adjuster together with the gearwheel viewed in direction 'C' according to FIG. 2.
Figure 4:
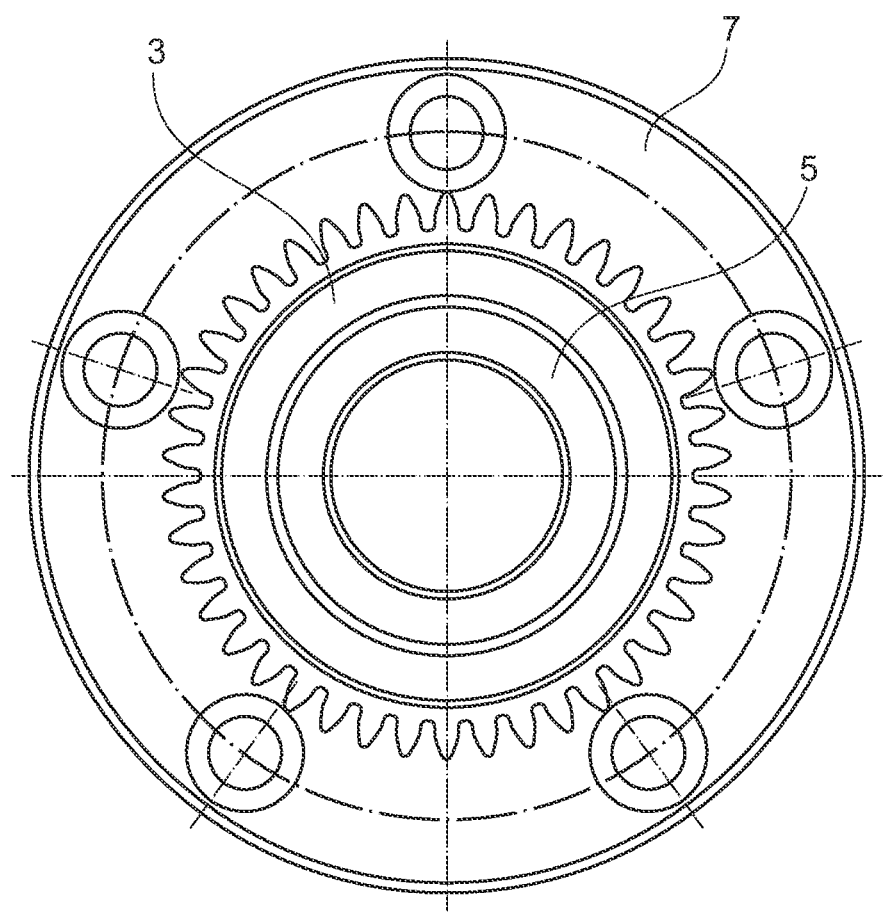
FIG. 4 shows the cover of the camshaft adjuster together with the gearwheel viewed in direction 'D' according to FIG. 2.
Figure 6:
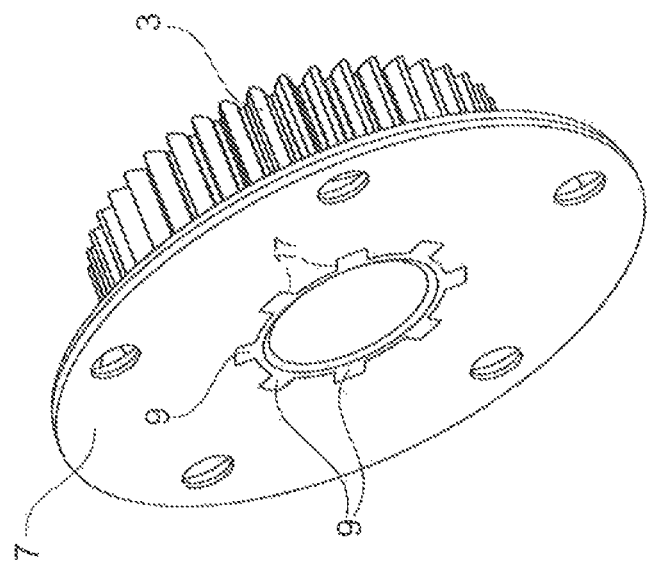
FIG. 6 shows a perspective view of the cover of the camshaft adjuster together with the gearwheel according to FIG. 2, viewed in a different direction compared to FIG. 5.
Figure 5:
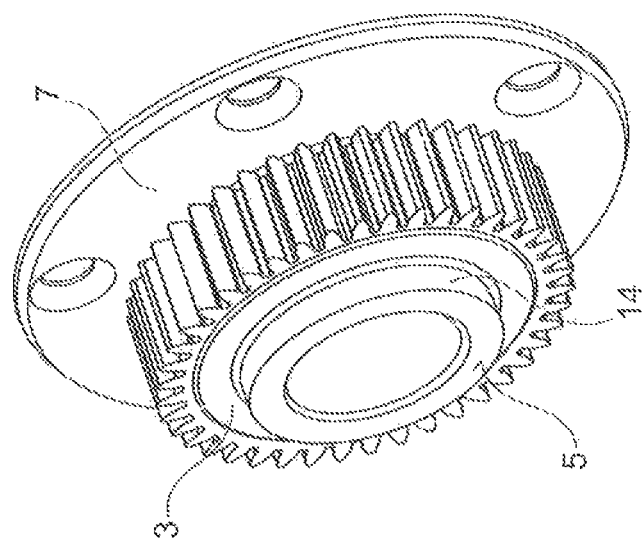
FIG. 5 shows a perspective view of the cover of the camshaft adjuster together with the gearwheel according to FIG. 2.

FIG. 1 represents a device 1 (camshaft adjuster) for varying the angular position of a camshaft 2 relative to a crankshaft (not shown) of an internal combustion engine. The camshaft 2 rotates about an axis of rotation 16. An essential part of the device is a drive element 4, which incorporates a hydraulic adjusting device, which is capable of bringing about an angular rotation between an outer annular part (stator) and the camshaft 2 (rotor), in order to influence the control timings of the internal combustion engine in a known manner.

For this purpose hydraulic chambers (not shown in more detail), to which hydraulic fluid can be admitted in order to be able to adjust said rotation, are effectively arranged in pairs between the drive element 4 and the camshaft 2. Multiple such pairs of hydraulic chambers are provided over the circumference.

The drive element 4 is here rotationally fixed to the crankshaft. This rotational coupling is produced by a gearwheel 3, which is here embodied as a spur gear and is rotationally fixed to the stator. More precisely stated, the spur gear 3 is rotationally fixed to a cover 7; the cover 7 is fixed to the stator by a screwed connection 12. At its outer circumference the spur gear 3 carries a toothing which—although not shown—meshes with a mating gearwheel, which is rotationally fixed to the crankshaft. The rotational movement of the crankshaft is accordingly transmitted to the drive element 4 (stator) by way of the gearwheel 3 and the cover 7.

At its end face remote from the camshaft adjuster 1 the gearwheel 3 fundamentally forms a bearing face 5 for the axial contact of the camshaft 2 or of a component 6 rotationally fixed to the latter. In this case the camshaft 2 is fixedly connected to a component 6, so that the component 6 can contact the bearing face 5, thereby creating an axial support for the camshaft 2 on the camshaft adjuster 1.

A drive torque for the drive element 4 can furthermore fundamentally be transmitted between the gearwheel 3 and the cover 7. As can be seen from the further FIGS. 2 to 6, the gearwheel 3 in the exemplary embodiment sketched therein comprises a hollow cylindrical body, adjoining which in both axial end areas are hollow cylindrical sections 13 and 14 (see FIG. 1). A defined axial bearing face of the gearwheel 3 against the cover 7 is here created in that an annular groove-like undercut 15 is sunk into the end face of the hollow cylindrical section 13 bearing against the cover 7.

It can be seen with reference to FIGS. 2 to 6 that the torque is transmitted between the gearwheel 3 and the cover 7 by a multiple-splined connection 8. In its axial end area the hollow cylindrical section 13 accordingly has splines 9 extending radially outwards, which mesh positively in corresponding recesses 17 in the cover 7 (see FIG. 3 and FIG. 6).

Figure 7:
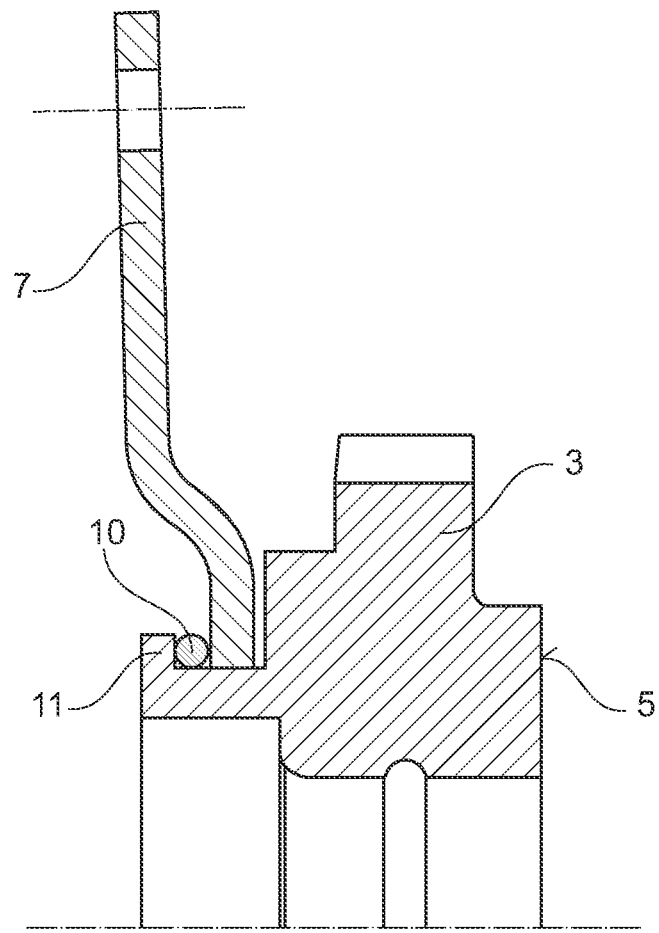
FIG. 7 shows the radial section through the cover of the camshaft adjuster together with the gearwheel in an alternative development of the invention.

An alternative possible fixing between the gearwheel 3 and the cover 7 is sketched in FIG. 7. Here use is made of a snap ring 10, which is arranged in an annular groove-like recess, which is formed by a flanged section 11.

A camshaft adjuster with an axial support for the camshaft between the spur gear 3 and the cylinder head can thereby be easily and cost-effectively achieved.

LIST OF REFERENCE NUMERALS

1 Device (camshaft adjuster)
2 Camshaft
3 Gearwheel
4 Drive element
5 Bearing face
6 Connected component
7 Cover
8 Multiple-splined connection/multiple-toothed connection
9 Splines/teeth
10 Snap ring
11 Flanged section
12 Screwed connection
13 Hollow cylindrical section
14 Hollow cylindrical section
15 Undercut
16 Axis of rotation

The invention claimed is:

1. A device for varying angular position of a camshaft relative to a crankshaft of an internal combustion engine, the device comprising:
  a drive element, which is driven by the crankshaft via a gearwheel and which is supported to be rotatable in relation to the camshaft; and
  at least two hydraulic chambers, to which a hydraulic fluid can be admitted in order to set a defined relative rotational position between the drive element and the camshaft, being formed between the drive element and the camshaft,
  wherein the drive element is supported to be rotatable in relation to the camshaft about an axis of rotation
  the device further comprising at least one cover arranged on an end face of the drive element, the gearwheel axially adjoining the cover and rotationally fixed to the cover, each of the drive element, the gear wheel, and the cover comprising a separate element, wherein an outside diameter of the gearwheel is smaller than an outside diameter of the drive element,
  the at least one cover being connected to the drive element by a first connection and the gear wheel being rotationally fixed to the cover by a second connection, the second connection being separate from and disposed radially inside the first connection relative to the axis of
  wherein the gearwheel forms a bearing face for the axial contact of the camshaft or of a component rotationally fixed to the camshaft; and
  wherein the gearwheel has a hollow cylindrical body and hollow cylindrical sections of reduced diameter adjoin the hollow cylindrical body axially on both sides, wherein the hollow cylindrical section facing the at least one cover has an annular groove-shaped undercut in an end face.

2. The device according to claim 1, wherein the bearing face is a slide bearing face.

3. The device according to claim 2, wherein the bearing face is a plane annular face.

4. The device according to claim 1, wherein the gearwheel is an externally toothed spur gear.

5. The device according to claim 1, wherein the second connection is a multiple-splined connection or a multiple-toothed connection formed between the cover and the gearwheel.

6. The device according to claim 5, wherein the second connection is the multiple-splined connection and has a number of splines or teeth extending radially outwards, which are arranged on the gearwheel and which extend axially into corresponding recesses in the cover.

7. The device according to claim 1, wherein the second connection positively connects the gearwheel and the cover to one another by means of a snap ring.

8. The device according to claim 1, wherein the first connection positively connects the gearwheel and the cover to one another by means of a flanged section of the gearwheel.

9. The device according to claim 1, wherein the first connection connects the cover to the drive element by means of a screwed connection.

10. The device according to claim 6, wherein the first connection connects the cover to the drive element by means of a screwed connection.

11. A device for varying angular position of a camshaft relative to a crankshaft of an internal combustion engine, the device comprising:
  a drive element, which is driven by the crankshaft via a gearwheel and which is supported to be rotatable in relation to the camshaft; and
  at least two hydraulic chambers, to which a hydraulic fluid can be admitted in order to set a defined relative rotational position between the drive element and the camshaft, being formed between the drive element and the camshaft,
  wherein the gearwheel forms a bearing face for the axial contact of the camshaft or of a component rotationally fixed to the camshaft; and
  at least one cover arranged on an end face of the drive element, the gearwheel axially adjoining the cover and rotationally fixed to the cover, each of the drive element, the gear wheel, and the cover comprising a separate element, wherein an outside diameter of the gearwheel is smaller than an outside diameter of the drive element,
  the at least one cover being connected to the drive element by a first connection and the gear wheel being rotationally fixed to the cover by a second connection, the second connection being separate from the first connection,
  wherein the second connection is a multiple-splined connection and has a number of splines or teeth extending radially outwards, which are arranged on the gearwheel and which extend axially into corresponding recesses in the cover, and
  wherein the multiple-splined connection has an axial fixing between the gearwheel and the cover in the form of at least one plastic deformation, which is introduced into the splines or the teeth and/or into the recesses.

12. The device according to claim 11, wherein the gearwheel has a hollow cylindrical body.

13. The device according to claim 12, wherein hollow cylindrical sections of reduced diameter adjoin the hollow cylindrical body axially on both sides.

14. The device according to claim 13, wherein one of the hollow cylindrical sections faces the cover and has an annular groove-shaped undercut in an end face.

* * * * *